No. 700,308. Patented May 20, 1902.
J. M. DODGE.
CONVEYER BELT.
(Application filed Aug. 27, 1901.)

(No Model.)

Witnesses:-
Herman E. Metius.
Wm. A. Barr.

Inventor:-
James M. Dodge,
by his Attorneys;
Hawson & Hawson

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

CONVEYER-BELT.

SPECIFICATION forming part of Letters Patent No. 700,308, dated May 20, 1902.

Application filed August 27, 1901. Serial No. 73,495. (No model.)

*To all whom it may concern:*

Be it known that I, JAMES M. DODGE, a citizen of the United States, residing in Philadelphia, Pennsylvania, have invented certain Improvements in Conveyer-Belts, of which the following is a specification.

The object of my invention is to overcome the objection to the ordinary form of conveyer-belt, which is bent or curved longitudinally, so as to more readily retain the material being carried. This object I attain by making the conveyer-belt in two or more sections hinged together, as fully described hereinafter, reference being had to the accompanying drawings, in which—

Figure 1:
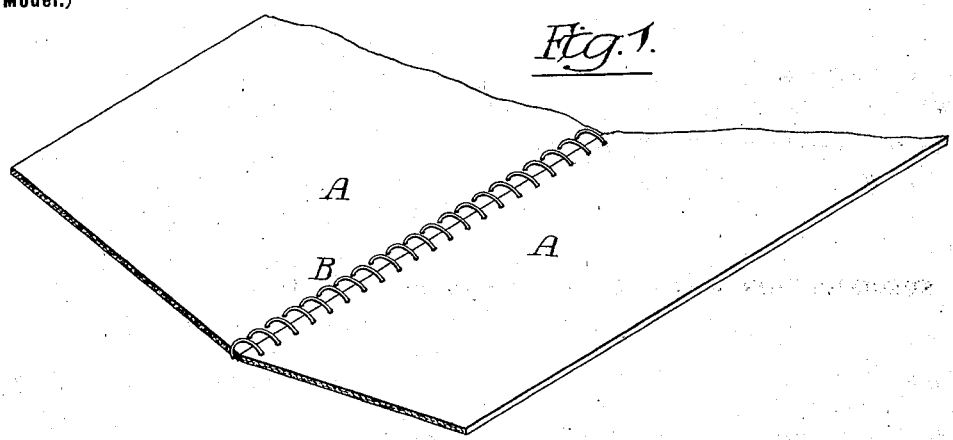
Figure 2:
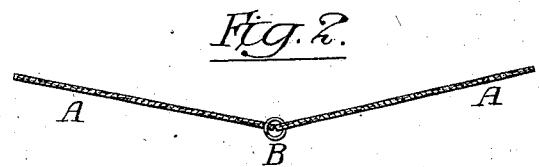
Figure 3:
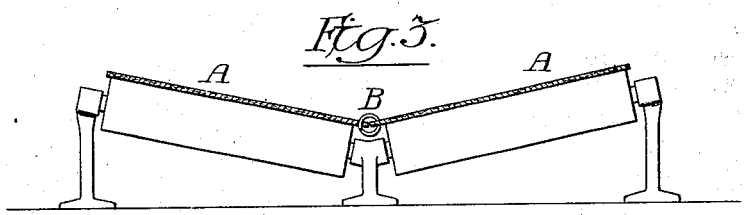
Figure 4:
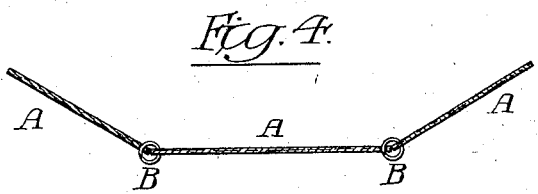

Figure 1 is a perspective view of one form of my improved conveyer-belt. Fig. 2 is a transverse sectional view of the belt shown in Fig. 1. Fig. 3 is a transverse sectional view of the belt, showing the supporting-rollers. Fig. 4 is a view of a modification of the belt, showing it made in three sections.

Conveyer-belts as ordinarily made of leather or other suitable flexible material are constructed for conveying granular and like materials. Flat belts of this type, if used, have to be of considerable width in order to carry the quantity of material demanded, and the flat belt has been displaced materially by a belt curved or bent longitudinally, so as to form a carrier which has great capacity; but this carrier has to be supported at intervals by suitable guides or rollers, so as to keep the belt curved on the carrying-run, and must be flattened at each end of the conveyer to pass around the guide-rollers. This action on the belt deteriorates it, and various means have been provided for strengthening the belt which add materially to the cost.

I overcome the objections noted by making the belt in two or more independent sections A A, Fig. 1, and these sections are coupled together at their abutting edges by suitable hinges B.

I preferably use the type of hinge shown in the drawings, as it makes the belt flexible throughout its entire length, and yet the abutting edges of the belt are so close as to prevent the escape of any granular material, and, furthermore, a hinge of this type which is made of wire will readily accommodate itself to the head rollers when the belt is flattened.

The sections can be made much lighter than heretofore owing to the fact that they are not required to be flexed except in passing around the head rollers, and the belt does not have to be reinforced.

The belts may be made in two longitudinal sections, as shown in Fig. 2, or they may be made in three sections, as shown in Fig. 4, forming a conveyer with abrupt side flanges.

I claim as my invention—

1. A conveyer-belt made of two or more independent endless sections arranged side by side, the abutting edges of the said sections being hinged together, substantially as described.

2. A conveyer-belt made of two or more independent endless sections arranged side by side, the abutting edges of the said sections being hinged together by a flexible hinge so that it will pass around the head wheels of the conveyer, substantially as described.

3. A conveyer-belt made of a central endless section and two side endless sections, said sections being flexible and the abutting edges of said sections being hinged together, substantially as described.

In testimony whereof I have signed my name to this specification in the presence of two subscribing witnesses.

JAMES M. DODGE.

Witnesses:
N. C. PEIRSON,
E. FUHR.